United States Patent [19]

Reinhardt et al.

[11] 4,072,796
[45] Feb. 7, 1978

[54] PROCESS FOR HYDROPHOBIZATION OF FINELY DIVIDED SILICA AND SILICATES USING PREPOLYCONDENSED ORGANOSILANE

[75] Inventors: Helmut Reinhardt, Rodenkirchen; Karl Trebinger; Gottfried Kallrath, both of Wesseling, all of Germany

[73] Assignee: Deutsche Gold- und Silber-Scheideanstalt vormals Roessler, Frankfurt, Germany

[21] Appl. No.: 581,890

[22] Filed: May 29, 1975

[30] Foreign Application Priority Data

July 25, 1974 Germany .............................. 2435860

[51] Int. Cl.² ...................... B32B 17/00; C01B 33/18
[52] U.S. Cl. .................................. 428/405; 427/221; 260/42.15
[58] Field of Search ....................... 427/220, 221, 387; 428/405; 260/375 B, 42.15

[56] References Cited

U.S. PATENT DOCUMENTS

| 2,911,324 | 11/1959 | Evans et al. ........................... 427/387 |
| 2,993,809 | 7/1961 | Bueche et al. ......................... 427/220 |
| 3,252,825 | 5/1966 | Marzocchi et al. ................... 427/220 |
| 3,859,320 | 1/1975 | Atherton ........................... 260/375 B |
| 3,904,787 | 9/1975 | Trebinger et al. .................... 427/220 |
| 3,920,865 | 11/1975 | Laufer et al. ......................... 427/387 |

FOREIGN PATENT DOCUMENTS

| 856,738 | 11/1970 | Canada .................................. 427/387 |
| 1,074,559 | 2/1960 | Germany .............................. 427/220 |
| 705,261 | 3/1954 | United Kingdom ................. 427/387 |

*Primary Examiner*—Harry J. Gwinnell
*Assistant Examiner*—S. Silverberg
*Attorney, Agent, or Firm*—Cushman, Darby & Cushman

[57] ABSTRACT

Finely divided hydrophobic silica and silicates are prepared by precipitating of alkali silicate solutions with mineral acids or metal salt solutions and treated with organohalosilanes. To the acid precipitation suspension recovered in known manner there is added as a hydrophobizing agent an organohalosilane, preferably at about 50° to 90° C., the precipitated product filtered, washed and dried and there subjected to a temperature of 300° to 400° C. There is used as the organohalosilane a prepolycondensed organohalosilane or a mixture of prepolycondensed organohalosilanes.

14 Claims, No Drawings

PROCESS FOR HYDROPHOBIZATION OF FINELY DIVIDED SILICA AND SILICATES USING PREPOLYCONDENSED ORGANOSILANE

BACKGROUND OF THE INVENTION

The invention is directed to a process for the hydrophobization of finely divided silica and silicas by treating of an acidic aqueous suspension of the oxide with an organohalosilane at temperatures in the range of 50° to 90° C., filtering of the solid portion, washing and drying of the filter cake and subsequently tempering at temperatures in the range of about 300° to 400° C.

It is known to hydrophobize finely divided wet precipitated silica by a so-called coating. For this purpose one can operate, for example, by allowing a silicone oil to act on either the aqueous suspension of a precipitated silica or on a suspension of the dry powder in an organic solvent. It is also known to emulsify silicone oils in amounts up to 10% in a sodium silicate solution and to precipitate from this a modified silicate with a heavy metal salt which forms a difficultly soluble compound with silica. It is further known to hydrophobize silica or silicates by vaporization of organohalosilanes. Besides it is known to treat a mixed solution of 90% sodium silicate and 10% sodium methyl siliconate with the hydrogen form of an ion exchanger. In these processes through neutralization there is formed a sol which is azeotropically dewatered and then dried. Finally there has also been described the hydrophobization by esterification with alcohols at elevated temperatures. Also in these processes the excess alcohol must be recovered by distillation.

In another known process the pasty silica produced by wet precipitation followed by filtration or centrifuging is subsequently washed and treated with alkaline material. Thereby a pH of 8 to 12, preferably 9 to 10 is established. Then silicone oil or a silicone oil suspension is added and after this treatment the composition is dried, for example, at temperatures of 100° to 120° C. The addition of the silicone oil or the silicone oil emulsion takes place simultaneously with or after a preceding liquefaction of the filter cake or the centrifuge residue. This liquefaction takes place through the effect of suitable mechanical forces in the above-mentioned pH range. The desired pH value is attained by addition of an alkali solution or aqueous ammonia. The silicone oil treated silica obtained in this way according to an advantageous form of the invention before the drying can be freed of excess liquid by expressing.

The silica treated by the process of the invention can be used with advantage where it is important to have a small wetting angle of the silica against water; for example in cable mixtures, water resistant vulcanizates, as thickening agents for water resistant lubricants and non-foaming cosmetics.

All known coating processes have the object of covering the large active surface of the finely divided wet precipitated silica with as dense as possible layer of organic groups. Thereby the hydroxyl groups are bound or shielded by organic radicals so that they will no longer have effect as active fillers for elastomers and other polymers. Moreover, because of the easy breakdown of the thin organic layer these products lose their hydrophobic properties very easily. Apart from this the previously known hydrophobizing processes are very cumbersome and time consuming. This is especially true in those cases in which an organic solvent must be recovered.

To overcome the previously mentioned disadvantages according to a further known process a hydrophobic, coated, outstanding silica can be produced having a high resistance against saponifying agents by precipitating alkali silicate solutions with mineral acids and treating with organohalosilanes. Thus there is added to the acidic precipitated suspension recovered in known manner, at an elevated temperature of about 50° to about 90° C., an organohalosilane, the precipitated product filtered off, washed and dried and then subjected to a temperature treatment at about 300° to about 400° C. The product obtained has a loose structure and can be easily ground. The hydroxyl group found in the silica surface are further broken down by the temperature treatment whereby the hydrophobic properties are strengthened. Since the treatment is carried out in the precipitated suspension produced in known manner the use of special hydrophobizing apparatus is superfluous. Besides the suspension of precipitated silica can be washed quicker and more completely than the untreated suspension. It is possible to obtain a nearly electrolyte free product.

The process is suitably carried out by producing an acid precipitated suspension, for example, having a pH value of about 5 and preferably at a higher temperature of about 50° to about 90° C. the organohalosilane is added as slowly as possible using thorough stirring. Then it is recommended for completion of the reaction to stir further for some time. After the filtration the product is washed until neutral and the filter cake dried, for example in a shelf drier. The dried product is then admitted to the temperature treatment at about 300° to about 400° C. which can be done for example in a muffle furnace. Through this a breakdown of the hydroxyl groups takes place. Depending upon the desired degree of hydrophobization this can be continued for any desired time.

The hydrophobic properties can further be regulated by the amount of organohalosilane used. Generally it is sufficient to add amounts of above 10 to about 20 weight percent, based on the precipitated dry silica.

However, the last process has the disadvantage that the cost of silane is the greatest part of the cost of the crude material costs. Therefore a saving of silane would effect a considerable reduction in cost. There have already been tried experiments in which silane use is reduced by employing silicas of lower surface area. The effect was only slight if the saving does not take place in the composition in which the silica surface is reduced.

The hydrophobization degree of a silica can be ascertained very well by determination of the DBA number (dibutylamine number). The adsorption of dibutylamine is specific for acid groups, i.e., in the case of the silica the amine is only adsorbed by the silanol groups. If a silica is treated with silane with increasing addition of silane a reduction of the hydrophilic portion of the surface is observed and therewith the DBA-number. This is also established by determination of the methanol wettability, however, this method is first usable at a certain hydrophobicity. If there is pursued the change of DBA-number and therewith the dydrophobicity of a silica with increasing addition of silica, it is established that the change of DBA-number is always smaller with increasing silane addition. This means, if it is assumed, a fixed amount of silane covers a fixed surface that the silane yield is always smaller with increasing degree of hydrophobization. This is understandable since the silane concentration in the solution remains constant, the other reactant, however, the hydrophilic part of the silica, always decreases.

SUMMARY OF THE INVENTION

The object of the invention is to provide procedures which improve the yield in the last phase of the hydropobization process.

The invention starts from the position of devising a process for the production of a hydrophobic silica or silicate by precipitation of an alkali silicate solution, e.g., aqueous sodium silicate or aqueous potassium silicate with a mineral acid, e.g., sulfuric acid, hydrochloric acid, nitric acid, hydrobromic acid or phosphoric acid, or an aqueous metal salt solution, e.g., aluminum chloride, aluminum sulfate, ammonium chloride or ferric chloride ad treatment with organohalosilanes in which there is added an organohalosilane to the acidic precipitation suspension recovered in known way, preferably at temperatures of about 50° to about 90° C., the precipitated product filtered off, washed and dried and then subjected to a temperature treatment at about 300° to about 400° C.

The characteristic feature of the invention is the use as a hydrophobization agent of a prepolycondensed organohalosilane or a mixture of organohalosilanes, especially a prepolycondensed dimethyl dichlorosilane and methyltrichlorosilane.

In place of the dimethyldichlorosilane and methyltrichlorosilane there can be used for example other alkylhalosilanes, e.g., dimethyldibromosilane, methyltribromosilane, diethyldichlorosilane, ethyl trichlorosilane, dipropyldichlorosilane, diisopropyldichlorosilane, propyltrichlorosilane, dibutyldichlorosilane and butyl trichlorosilane to make the prepolymer. The degree of polymerization expressed by the number of silicon atoms in the prepolymer can be for example from 1 to 6. The prepolycondensed silanes form large molecules which at first are only loosely adsorbed but upon drying and tempering cover a large surface area.

Dimethyldichlorosilane and the silane mixture of dimethyldichlorosilane and methyltrichlorosilane (Silane Mixture (I)) were prepolycondensed. This was made possible by addition of the stoichiometrical amounts of water. The reaction products were only examined as hydrophobizing agents. The prepolycondensation reaction can be illustrated by the following model, however, considering the fact that a certain portion of the reactants form byproducts

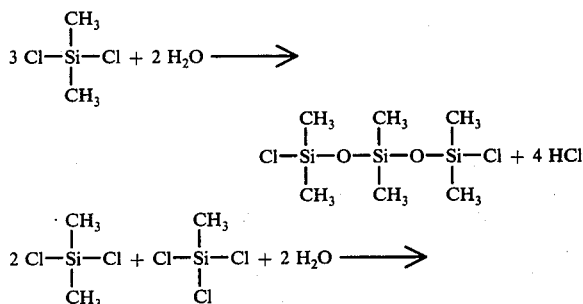

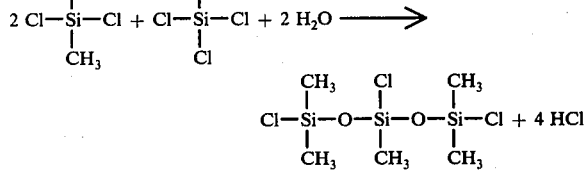

Both equations represent the stoichiometry of the total reaction for pure dimethyldichlorosilane and the silane mixture set forth on the left hand side of the second equation above. A certain portion of byproducts is not excluded.

Unless otherwise indicated all parts and percentages are by weight.

DESCRIPTION OF THE PREFERRED EMBODIMENT

The invention will be further explained in the following example.

The pretreatment of the silane can be carried out under various conditions. The reaction with water is ended after one hour, if the water is dropped into the boiling silane. An equally useful product is obtained if water and silane are stirred together at room temperature. In both bases considerable amounts of hydrogen chloride were set free. In working in the cold on account of the heat of evaporation in the reaction vessel this leads to a sinking below 0° C. The reaction time in this case amounts to about 4 hours. Even after several weeks of standing of the pretreated silane there was no ascertainable change in the hydrophobizing activity. The water and silane are employed in the amounts required to satisfy the equations set forth supra.

The hydrophobization was carried out using in each case a silica (VN-3 or VN-2 both of which are precipitated silicas manufactured by Degussa and which have the properties set forth below) /suspension in a stirring vessel equipped with breakers. In order to obtain a better general view there was employed as starting material a large amount of suspension into which the silane was introduced in small portions (2 weight % based on the amount of silica). After addition of each portion stirring was carried out for about another 5 minutes and before the addition of the next portion a sample was taken. This sample was filtered in the usual manner, washed and dried. In order to obtain uniform drying conditions, all samples were temperatured for ½ hour at 376° C. Then they were ground and their DBA-number determined. Comparison tests were carried out with untreated silane.

The starting products VN2 and VN3 are precipitated silicas with the following parameters:

|  | VN2 | VN3 |
|---|---|---|
| Loss on ignition at 1000° C. | 11% | 11% |
| Moisture content lost at 105° C. | 6% | 6% |
| $SiO_2$ | 87% | 87% |
| $Al_2O_3$ | 0.2% | 0.2% |
| $Na_2O$ | 0.8% | 0.8% |
| $SO_3$ | 0.5 | 0.8% |
| $Fe_2O_3$ | <0.05% | <0.05% |
| Specific gravity g/cm$^3$ | 2.0 | 2.0 |
| Tamped density g/l | 200 | 200 |
| pH value | 7 | 6.3 |
| BET-surface area m$^2$/g | 130 | 210 |
| Average primary particle size | 28 nm | 18 nm |

The starting product "Silteg AS7" is manufactured by Degussa is an aluminum silicate with the following parameters:

| SILTEG AS7 | |
|---|---|
| Loss on ignition at 1000° C. | 12% |
| Moisture content | |

-continued

| SILTEG AS7 | |
|---|---|
| lost at 105° C. | 6% |
| SiO$_2$ | 73% |
| Al$_2$O$_3$ | 7% |
| Na$_2$O | 7% |
| SO$_3$ | ≤0.5% |
| Fe$_2$O$_3$ | <0.05% |
| Specific gravity g/cm$^3$ | 2.0 |
| Tamped density g/l | 200 |
| pH value | 11.5 |
| BET surface area m$^2$/g | 60 |
| Average primary particle size | 35 mμ |

The results of these experiments are set forth in the following tables. Since in working with pretreated silane different stoichiometric ratios are present, the number for the silane addition was recalculated on the amount of starting silane in order to make it comparable.

Starting Product: VN 3-Suspension & Dimethyldichlorosilane

| NOT TREATED | | PRETREATED | |
|---|---|---|---|
| g silane/ 100 g SiO$_2$ | DBA-Number | g silane/ 100g SiO$_2$ | DBA-Number |
| 16 | 78 | 8.4 | 78 |
| 18 | 83 | 11.2 | 34 |
| 20 | 86 | 14.0 | 18 |
| 22 | 70 | 16.8 | 28 |
| 24 | 60 | 19.6 | 26 |

Starting Product: VN 3-Suspension & Silane Mixture (I)

| NOT TREATED | | PRETREATED | |
|---|---|---|---|
| g silane/ 100g SiO$_2$ | DBA-Number | g silane/ 100g SiO$_2$ | DBA-Number |
| 16 | 74 | 8.2 | 100 |
| 18 | 77 | 11.0 | 52 |
| 20 | 44 | 13.7 | 38 |
| 22 | 35 | 16.4 | 17 |
| 24 | 62 | 19.2 | 18 |

Starting Product: VN 2-Suspension

| Dimethyldichlorosilane Pretreated | | Silane mixture (I) Pretreated | |
|---|---|---|---|
| g silane/ 100g SiO$_2$ | DBA Number | g silane/ 100g SiO$_2$ | DBA Number |
| 8.4 | 97 | 8.2 | 56 |
| 11.2 | 45 | 11.0 | 43 |
| 14.0 | 31 | 13.7 | 32 |
| 16.8 | 26 | 16.4 | 31 |
| 19.6 | 28 | 19.2 | 24 |

Starting Product: Aluminum silicate AS 7 and Dimethyldichlorosilane

| Not Pretreated | | Pretreated | |
|---|---|---|---|
| g silane/ 100g AS 7 | DBA Number | g silane/ 100g AS 7 | DBA Number |
| 16 | 60 | 8.3 | 59 |
| 18 | 57 | 11.2 | 49 |
| 20 | 53 | 13.9 | 24 |
| 22 | 49 | 16.6 | 31 |
| 24 | 35 | 19.5 | 20 |

Products with a methanol wettability which corresponds to a specification for the comparison product which was hydrophobized with untreated silane has a DBA number of about 50.

In order to avoid deviations from the obtained values the uniformity of the stirring conditions must be guaranteed. Also in considering certain fluctuations in values it has been shown that the use of prepolymerized silane should not exceed 15 grams per 100 grams of the silica (or silicate) to be hydrophobized. Usually the amount of prepolymerized silane is at least <10 gram per 100 grams of silica (or silicate).

The new hydrophobic products can be used as fillers in elastomers, e.g., natural rubber, butadiene-styrene copolymer, polybutadiene, polyisoprene and other polymers, as pigments for organic binders, as matting agents in lacquers as well as being especially advantageous in defoaming compositions.

The process of the invention in an analogous manner also permits hydrophobization of especial titanium dioxide as well as zirconium dioxide.

The process can comprise, consist essentially of or consist of the steps and conditions set forth supra.

When mixtures of organohalosilanes are employed the amount of each organohalosilane can vary widely, e.g., from 1 to 50 mol % of the total organohalosilane.

We claim:

1. In a process for the production of a finely divided hydrophobic silica or silicate by precipitation of an alkali silicate solution with a mineral acid or acidic metal salt solution and treatment of the acidic wet suspension at a temperature of about 50° to about 90° C. with an organohalosilane as a hydrophobizing agent, filtering, washing and drying of the organohalosilane treated precipitate and then tempering at about 300° to 400° C. the improvement comprising employing as the organohalosilane either a prepolycondensed organohalosilane or a prepolycondensed mixture of organohalosilanes, said prepolycondensed organohalosilane or mixture thereof having been prepared by reacting said organohalosilane or mixture of organohalosilanes with a stoichiometrical amount of water said prepolycondensed organo-silane having up to 6 silicon atoms.

2. The process of claim 1 wherein the halogen is chlorine.

3. The process of claim 1 wherein the prepolycondensed organohalosilane is a prepolymerized dialkyldihalosilane or prepolymerized mixture of a dialkyldihalosilane and a monoalkyltrihalosilane.

4. The process of claim 3 wherein the organohalosilane employed to form said prepolycondensed organohalosilane is (1) dimethyldichlorosilane or (2) a mixture of dimethyldichlorosilane and methyltrichlorosilane.

5. The process of claim 4 wherein the organohalosilane is dimethyldichlorosilane.

6. The process of claim 5 wherein the prepolycondensed organohalosilane is prepared from 3 moles of dimethyldichlorosilane and 2 moles of water.

7. The process of claim 4 wherein the organohalosilane is a mixture of dimethyldichlorosilane and methyltrichlorosilane.

8. The process of claim 7 wherein the prepolycondensed organohalosilane is prepared from 2 moles of dimethyldichlorosilane, 1 mole of methyltrichlorosilane and 2 moles of water.

9. The process of claim 1 wherein the material that is hydrophobized is silica.

10. The process of claim 1 wherein the amount of hydrophobizing agent employed is sufficient to effect hydrophobization of the silica or silicate but does not exceed 15% of the silica or silicate by weight.

11. The process of claim 10 wherein there is used 2 to 15% of the hydrophobizing agent based on the silica or silicate.

12. Silica or silicate hydrophobized by the process of claim 4.

13. Silica hydrophobized by the process of claim 4.

14. Silica or silicate hydrophobized by the process of claim 1.

* * * * *